United States Patent [19]

Jacobson

[11] Patent Number: 4,575,429

[45] Date of Patent: Mar. 11, 1986

[54] COMPOSITE SELF LUBRICATING BEARINGS

[75] Inventor: Charles B. Jacobson, Yardley, Pa.

[73] Assignee: Garlock Bearings, Inc., Thorofare, N.J.

[21] Appl. No.: 677,828

[22] Filed: Dec. 4, 1984

[51] Int. Cl.⁴ ............................................. F16C 33/12
[52] U.S. Cl. ................................... 252/12; 252/12.2; 252/21; 384/279
[58] Field of Search .......................... 252/12, 12.2, 21; 384/279

[56] References Cited

U.S. PATENT DOCUMENTS

| | | | |
|---|---|---|---|
| 3,878,113 | 4/1975 | Campbell et al. | 252/12 |
| 3,879,301 | 4/1975 | Cairns | 252/12 |
| 3,882,030 | 5/1975 | Campbell et al. | 252/12 |
| 3,994,814 | 11/1976 | Cairns | 252/12.6 |
| 4,000,942 | 1/1977 | Ueda | 29/182.3 |
| 4,086,376 | 4/1978 | Davis | 252/12 |
| 4,115,283 | 9/1978 | Needham | 252/12.4 |
| 4,139,576 | 2/1979 | Yoshimura et al. | 260/857 |
| 4,157,273 | 6/1979 | Brady | 156/315 |
| 4,172,622 | 10/1979 | Baker et al. | 308/237 R |
| 4,312,772 | 1/1982 | Mori | 252/12.2 |
| 4,394,275 | 7/1983 | Bickle et al. | 252/12 |
| 4,423,093 | 12/1983 | Davies | 252/12 |
| 4,439,484 | 3/1984 | Mori | 428/318.4 |

*Primary Examiner*—Jacqueline V. Howard
*Attorney, Agent, or Firm*—Woodcock, Washburn, Kurtz, Mackiewicz & Norris

[57] ABSTRACT

Improved composite bearings are provided employing cold forming and sintering techniques. Improvements in compositions for impregnating porous layers of composite bearings are provided comprising lead or lead alloy, perfluorinated polymer, particulate thermoplastic polymer and clay in particular proportions. When such materials are formed into bearings and subsequently sintered, improved resistance to stripping and wear is provided.

19 Claims, No Drawings

COMPOSITE SELF LUBRICATING BEARINGS

BACKGROUND OF THE INVENTION

This invention is directed to improvements in composite self lubricating bearings. More particularly, this invention provides improvements to bearings which have been sold under the denomination of "DU" bearings. Such bearings are well known to those skilled in the art as comprising a metal backing layer; a porous layer, generally of sintered bronze, on the metal backing layer; and a cold-formed, sintered layer on the porous layer of a self-lubricating material. The self-lubricating material has traditionally comprised polytetrafluoroethylene and lead in intimate admixture. The bearings are distinct from heat processed bearings such as those which employ thermal extrusion or injection molding.

Such composite bearings, while enjoying widespread utility in shock absorbers, gear pumps, MacPherson struts, and a wide variety of other applications, have suffered from significant shortcomings and limitations. In particular, these bearings have exhibited a tendency towards cavitation, that is, to the formation of erosion sites in the self-lubricating layer leading to cavities, delamination, stripping, and general wear. These shortcomings have been exacerbated by the tendency towards employing such bearings in shock absorbers and MacPherson struts which require increased load bearing and sliding capabilities. Moreover, such bearings must withstand hydraulic stress caused by exposure to turbulent oil flow present in connection with many bearing applications. Thus, a long-felt need has arisen for bearing materials which exhibit decreased cavitation, which avoid stripping of bearing materials from the sliding surface of the bearing, and which exhibit improved wear resistance and concomitant longer life. This long-felt need is reflected in the attempts of others to solve the foregoing problems.

U.S. Pat. No. 3,882,030—Campbell is directed to bearings which are compression or injection moldable. Campbell employs polyphenylene sulfide in large amounts as a carrier resin for the injection molding process. The bearings are not generally based on polyfluorinated material.

U.S. Pat. No. 3,994,814—Cairns, assigned to the assignee of this invention, is directed to injection molding and melt extrusion production methods for the manufacture of bearings. The processes thus disclosed are intended to "avoid costly cold forming and sintering techniques" and include major proportions of thermoplastic resins to permit such processing to take place. The thermoplastic resins may include polyarylene sulfides.

U.S. Pat. No. 4,000,982—Ueda is directed to certain improvements in cold-formed bearings through the inclusion of zinc metal in lieu of the traditionally used lead. This patent is significant for its recognition, as of its 1975 filing date, of the wear problems experienced in reciprocating devices such as shock absorbers and the like.

U.S. Pat. No. 4,172,622—Baker et al. reduces friction in certain composite-structure bearings through use of predominant amounts of polyphenylene sulfide. PTFE and other components may be added to the PPS.

U.S. Pat. No. 4,115,283—Needham is directed to anti-friction compositions for bearings comprising, predominantly, polyarylene sulfides. Solid lubricants, including PTFE, may be admixed in minor proportion. Fillers, including hydrated aluminum silicates, may also be included. Reinforcing materials such as carbon, glass, boron, or other fibers are an obligatory constituent. The materials are adapted for employment in injection molding or other thermoplastic molding processes.

U.S. Pat. No. 4,139,576—Yoshimura is directed to compositions useful for thin coatings on cookware to provide non-stick properties and the like. The coatings comprise polyarylene sulfide resin, imido resin, and a fluorocarbon polymer.

U.S. Pat. No. 4,312,772—Mori provides certain improvements in composite bearing materials and reflects the long felt need for additional improvements. The patent discloses certain lead compounds and alloys in the lubricating layer of bearings.

U.S. Pat. No. 4,394,275—Bickle et al. provides bearing materials including from 30 to 60% polyvinylidene fluoride to improve machinability.

U.S. Pat. No. 4,157,273—Brady is directed to the employment of polyarylene sulfide combined with PTFE as an adhesive. Polyarylene sulfide is present in proportions of at least 2:1 over the PTFE in the compositions. The reference teaches away from the employment of these materials in bearings.

U.S. Pat. No. 4,439,484—Mori discloses the wearing and cavitation problems which are experienced with self-lubricating bearings. Mori attempts to overcome these problems by using PFA/PTFE low-friction coatings on composite backings.

Bearings have been sold under the name "Clean Metal" by the Senju Company of Japan. They are believed to be composite bearings comprising, as a lubricating layer, a PTFE-acetal copolymer together with polyphenylene sulfide and lead. This bearing is believed to have been formed through an extrusion process, requiring a high proportion of acetal polymer or the use of an acetal co-polymer sufficient to allow the material to melt and flow.

The present invention overcomes the shortcomings of prior composite bearings or diminishes their effect by providing improved composite bearings employing a synergistic combination of materials for the sintered, self-lubricating layer. The combination has certain critical limitations, as will more fully hereinafter be described.

SUMMARY OF THE INVENTION

This invention provides self-lubricating, composite bearings having improved resistance to stripping and cavitation and exhibiting improved wear resistance. The bearings comprise a metal backing; a porous layer on the backing, preferably comprising a porous metal such as sintered bronze powder; and a sintered lining on, and impregnated into, the porous layer formed from a blend. The blend comprises lead or a lubricating alloy of lead together with perfluorinated polymer having weight ratios of lead or alloy to polymer between about 1.0 and 1.5. The perfluorinated polymer may comprise either polytetrafluoroethylene or substantially perfluorinated copolymers of polytetrafluoroethylene. The blend further comprises from about 3 to about 15% weight of a particulate thermoplastic polymer, and from about 1 to about 15% by weight of a clay.

The thermoplastic polymer must have certain critical properties. Thus, it must be present in a particulate form with a mean particle size less than about 20 microns. Moreover, the thermoplastic polymer is selected to improve the adherence of the sintered lining to the porous layer, and the coherence of the materials of the sintered lining inter se. The thermoplastic polymer must also be substantially undegraded when sintered in the blend to form the bearing. The thermoplastic polymer should not significantly increase, and should preferably decrease, the static and kinetic friction of the lubricating surface of the bearing to steel mating surfaces in various service applications. In accordance with a preferred embodiment, the thermoplastic polymer is a polyarylene sulfide such as polyphenylene sulfide.

OBJECTS OF THE INVENTION

It is a principal object of this invention to provide composite bearings formed without thermoplastic extrusion or thermal molding having improved resistance to cavitation, stripping and wear.

Another object is to provide composite bearings which have improved adherence of the lubricating layer to the porous layer of the bearings and improved cohesion of the lubricating layer.

An additional object is to provide composite bearings which maintain or decrease the static and kinetic friction values established by prior composite bearings to steel surfaces used in commercial applications.

A further object is to secure improved bearing materials which may be formed into bearings through cold forming or cold molding and subsequent sintering.

Yet another object is to provide shock absorbers, MacPherson struts, and the like employing novel bearings which can withstand turbulent oil flow.

These and other objects will be apparent from a review of the instant specification.

DETAILED DESCRIPTION OF THE INVENTION

This invention provides improvements in composite bearings including certain laminated structures. Thus, such bearings comprise a metallic backing layer and a porous layer on the backing layer. Preferably, the porous layer comprises a sintered copper alloy, especially bronze. A low friction layer is applied onto and impregnated into the porous layer. The low friction layer comprises a blend having lead and/or a lead alloy having low-friction properties together with a fluorinated polymer such as polytetrafluoroethylene (PTFE). Prior bearings of this type have been denominated by one maker "DV" bearings. Such bearings have enjoyed wide popularity in many uses, especially shock absorbers, MacPherson struts, gear pumps and other uses. Bearings of this type have been described in the patent literature, including, for example: U.S. Pat. Nos. 2,689,390—Tait; 2,691,814—Tait; 2,704,234—Love et al.; 2,731,360—Love; 2,788,324—Mitchell; 2,798,005—Love; and 2,813,041—Mitchell in addition to certain of the patents discussed hereinabove.

Those of ordinary skill in the art are generally familiar with the construction of prior composite bearings. A metallic backing layer such as stainless steel or other metal is preferably coated with a powdered material such as a copper based alloy, especially bronze. The powder layer is then trued into the desired shape and caused to be sintered under appropriate conditions of time and temperature to result in a porous metallic or other porous layer in good adhesion with and laminated to the metallic underlayment layer. A slurry or "mush" of the material which is to form the low-friction layer of the composite bearing is then prepared. This "mush" comprises lead or a low friction alloy of lead preferably in major weight proportion together with a perfluorinated or substantially fluorinated polymer or copolymer, especially polytetrafluoroethylene, PTFE. The "mush" is then placed on and impregnated into the porous layer by compression at a temperature substantially below the melting temperature of the polymeric components of the mush and of the lead or lead alloy in a fashion as to form a layer on the porous layer. The foregoing step is known as cold forming. The components of the mush are selected to be capable of impregnating substantially completely throughout the interstices of the porous layer. Thus, the low-friction composition forms a gradual transition into the porous layer. The outer surfaces of the low friction layer are then trued to the desired physical conformations and sintered under appropriate conditions of time and temperature to form a finished continuous composite coiled strip for fabrication into plain bearings of various dimension.

The bearings as described hereinabove must be distinguished from composite bearings which are formed from extrusion or forming processes which take place at elevated temperatures. Injection molded and similar systems require differing proportions of carrying resins which render the low-friction material amenable to hot processing and extrusion. Such compositions generally comprise greatly in excess of 50% of polymeric resins, usually in excess of 60%. In such cases, the resin composition generally reflects the necessity of modification for hot processing and generally comprises resins such as acetal, polyethylene and others which are suitable for such processing. Polytetrafluoroethylene and other perfluorinated hydrocarbons which are required for low-friction properties are generally present in diminished proportion when compared with the carrying thermoplastic resin, thus leading to diminished efficacy in terms of the non-slip properties of the bearing.

The temperatures reached by sintering processes for PTFE and its copolymers in accordance with the cold forming-sintering processes to which the instant improvements are directed are also higher than those of typical heat extrusion processes. Thus, materials and proportions of materials which might be suitable for heat extrusion and the like would not necessarily be suitable for cold forming-sintering processes. More particularly, high proportions of certain polymers such as polyphenylene sulfide cannot be employed in processes involving sintering since the melting point of polyphenylene sulfide is below the sintering temperature of polytetrafluoroethylene. Polyphenylene sulfide, in high proportion, is known to flow as a liquid during sintering. Since it is desired to sinter bearings in accordance with the present invention at relatively high temperatures, to secure improved crystalline properties as to improve wear resistance and lubricity of the resulting bearings, the employment of polyphenylene sulfide and similar polymers would appear to those of ordinary skill in the art to be contraindicated.

It has now been discovered to improve the resistance to wear of composite bearings, to increase the cohesiveness of non-stick sintered coatings on composite bearings, and to increase the effective adhesion of such coatings to porous intermediate layers of laminated bearings, by employing synergistic combinations of particulate thermoplastic polymers having carefully defined particle sizes and clay in the "mush" material from which the non-slip coatings are formed. More particularly, it has been found that the addition of from about 3 to about 15% of particulate thermoplastic polymer by weight of the blend used to coat and impregnate a porous layer of a composite bearing, together with from about 1 to about 5% by weight of the blend of clay leads to sintered bearings having reduced tendencies toward cavitation, stripping and wear. It has been found that certain thermoplastic polymers such as polyarylene sulfides which would have been expected by those skilled in the art to lead to degradation of the bearing upon sintering when included in such blends do not in fact so degrade in accordance with this invention and serve to effectively and beneficially modify the physical properties of such composite bearings.

More particularly, it has been found that when included in relatively small proportions in "mush" from which the non-stick surfaces are to be formed, polyarylene sulfides such as polyphenylene sulfide do not melt and flow in a fashion as to lead to bearing degradation during the sintering step. This is surprising, since polyphenylene sulfide goes through its glass transition temperature at approximately 550° F. well below the conventional 675° F. sintering temperature of composite bearings. However, it has been found that in the complex formulation which comprises the improvement in accordance with the instant invention, the degradation does not proceed to an extent such as to deleteriously effect the resulting bearing. Nor does the limited quantity of polyphenylene sulfide (or other suitable thermoplastic), when surrounded and encapsulated by other ingredients, permit a free flow of the polymer above the glass transition temperature.

The self-lubricating compositions of the invention also comprise clay. While the exact function of particulate clay in the synergistic combinations of the instant invention is not known with particularity, it has been found that the inclusion of clays such as kaolin, having Mohs hardness of less than about 3, preferably less than about 2.5, and even more preferably between about 2 and about 2.5, improves the beneficial properties of the resulting bearings. Even more particularly, it has been found that the particulate thermoplastic resin such as polyarylene sulfide and the particular clay such as kaolin exercise a synergistic effect upon each other. This effect has not been explained with precision but has been demonstrated by the collected test data.

In accordance with the present invention, self-lubricating composite bearings are provided having improved resistance to stripping and improved resistance to wear. These bearings comprise a metal backing, a porous layer on the backing, and a sintered lining on and impregnated into the porous layer. The lining is formed from a blend comprising lead or a lubricating alloy of lead, a perfluorinated polymer, and a combination of a thermoplastic polymer having a particle size less than about 20 microns and a clay. The thermoplastic polymer is selected to improve the adherence of the sintered lining to the porous layer and is further selected to be substantially undegraded upon sintering of the blend to form the bearing.

The metal backing and porous layer can be any of those materials which are known to those of ordinary skill in the art to be useful for such purposes. Thus, the metal backings may comprise stainless steel, other steels, and a wide variety of other metals. It is necessary only that the metal backing have physical strength and temperature stability sufficient to endure the processing steps necessary to form and sinter the bearing. The porous layer on the backing is preferably a copper alloy such as bronze formed from a powder and subsequently sintered. Many other porous formations may be employed as well, however, including powdered aluminum, powdered alloys, and even certain polymeric materials such as stranded PTFE, fibrous high temperature plastics, powdered high temperature plastics and the like.

The sintered lining is formed from a blend or "mush" comprising lead or a lubricating alloy of lead such as a lead-tin alloy together with a perfluorinated polymer. The perfluorinated polymer may be any substantially fluorinated homopolymer or copolymer of polytetrafluoroethylene. The lead or lead alloy and the perfluorinated polymer are present in weight ratios between about 1.0 and 1.5 of lead or alloy to polymer. The lead and perfluorinated polymer are preferably present in finely particulated form, in a blend, or in any of the other forms known to those of ordinary skill in the art for the preparation of composite bearings.

Particulate thermoplastic polymer is added to the blend in amounts of from about 3 to about 15% and preferably from about 5 to about 15% by weight of the blend. The thermoplastic polymer has a mean particle size less than about 20 microns, preferably less than about 15 microns and even more preferably less than 10 microns. In accordance with certain preferred embodiments, the particulate thermoplastic polymer is present in amounts from about 6 to about 12% by weight of the blend. The particulate thermoplastic polymer is best described by what it does rather than what it is. Polymers are suitable which are amenable to fine particulation in accordance with the present invention, which serve to adhere the porous layers of the composite bearings to the low friction PTFE-lead bearing surfaces, and which, when sintered to form the bearing, do not substantially degrade. Preferably, such polymers comprise polyarylene sulfides, especially polyphenylene sulfides. Other polymers, such as polyamides, polyamid-imids, polyimids, and polyether ether ketones may also be used in some circumstances.

The blend further comprises from about 1 to about 5% and preferably from about 2–4% by weight of the blend of clay. The clays are selected to have a Mohs hardness of less than about 3 and preferably between about 2 and about 2.5. The clays are present in finely particulated form. Any clay having the foregoing properties may be employed, however, kaolin is preferred. The clay is present in particulate form having average diameters less than about 1 micron and more preferably less than about one-half micron.

The foregoing synergistic combination of thermoplastic particulate polymer and clay is incorporated in the blend or "mush" from which the lubricating surface of the composite bearing is formed. No substantial modification of the processes employed for the preparation, application and sintering of such lining materials or blends is generally required. Bearings in accordance with the instant invention are sintered to effect coalescence of the self-lubricating layer for a time and at a temperature sufficient to effect the sintering of the lining but insufficient to cause substantial degradation of the thermoplastic polymer.

The following non-limiting examples illustrate certain preferred embodiments of the instant invention and compare the same with certain aspects of prior bearings. The synergistic nature of the combination of particulate thermoplastic polymer and clay is demonstrated.

EXAMPLE 1

A commercial composite bearing and modified bearings were constructed by formulating blends of lead and PTFE with various additives, applying the blends to laminated structures and sintering the resulting articles. Mild steel upon which bronze particles had been sintered to form a porous layer in the conventional fashion was employed as the laminated underlayment. Standard practices for the preparation of commercial bearings were employed.

A variety of polymers and minerals were evaluated as additives to the PTFE and lead self-lubricating coating blends. The additive ingredients investigated frequently required a reduction of particle size and/or agglomerate fracture to insure that the coating overlay mixture would disperse uniformly and that individual particles would be less than the approximately 20 micron thickness desired for the self lubricating overlay layer. Size reduction of the raw material additives, when necessary, was accomplished by premixing the additive ingredient(s) in a water slurry comprising 1 part additive(s) to 3.8 parts water with 0.09 parts wetting agent, Titanox 100 (Rohm & Haas Co.), by weight. The slurry was subjected to the shear of a high-intensity mixer (Waring blender). Equally effective particle size reduction of these additive raw materials may likely be obtained by appropriate ball milling processes or particle impact milling procedures.

The slurry containing additive(s) was introduced into the conventional mixing cycle for prior commercial blends containing PTFE suspensions (Teflon 35, E. I. DuPont de Nemours & Company or Fluon AD 584, Imperial Chemical Industries Americas Inc.) before the addition of lead. Lead (SF Grade Powder, S.C.M. Metal Products) was then added and the preparation blended. Mixing was terminated after the addition of an ionic salt solution to "break" the suspension promoted by the wetting agent. Coagulation of the soilds followed upon the rapid settling of this mixture. The supernatant liquid was drained, and a granular sized, putty-like textured residue of uniform dispersion isolated. This mixture contained approximately 89% total solids comprising PTFE, lead, and additive(s), the balance being entrained water.

A conventional bearing along with comparative and exemplary bearings were formulated from the following blends:

| Wt. % of Solids | Conventional Run 1 | Run 2 through Run 8 | Run 9 | Run 10 | Run 11 |
|---|---|---|---|---|---|
| PTFE | 44.9 | 42.3 | 42.3 | 40.0 | 37.9 |
| LEAD | 55.1 | 51.9 | 51.9 | 49.0 | 46.4 |
| Single Additive | 0 | 5.8 | 0 | 0 | 0 |
| Dual Additives | 0 | 0 | 5.8 | 11.0 | 15.7 |

The additive compositions were as follows:

| Run 2 | Talc-Mistron Vapor Grade, Talc Div. Cyprus Industrial Minerals Co. |
|---|---|
| Run 3 | Perfluoroalkoxy Resin (PFA) Grade 335J, E. I. DuPont de Nemours |
| Run 4 | Acetal Copolymer Grade C202, Celanese Chemical Company |
| Run 5 | Polyphenylene Sulfide Grade P-6, Philips Chemical Company |
| Run 6 | Polyphenylene Sulfide Grade P-4, Philips Chemical Company |
| Run 7 | Polyphenylene Sulfide Grade V-1, Philips Chemical Company |
| Run 8 | Clay Grade "Recco" (kaolin clay), W. R. Grace & Co., Davidson Chemical Division |
| Run 9-11 | 3 to 1 blend by weight of polyphenylene sulfide grade V-1 and "Recco" clay |

EXAMPLE 2

Thrust washers and bushings were fabricated from laminated coils of steel and sintered bronze which had been impregnated and overcoated with the foregoing modified or unmodified compositions in accordance with Example 1 and sintered in accordance with conventional practice at 675° F. for 3 minutes.

EXAMPLE 3

Wear Life Test—Non-lubricated Mode

Thrust washers of ¾" ID×1⅛" OD were mated to a wear surface of 1040 steel having a 4 microinch finish. The steel surface was rotated at 450 rpm (115 fpm) and loaded to 117 psi contact pressure. The testing was continued for 200 hours for each bearing while the wear depth was periodically recorded. The weight losses of synergistic compositions were compared to unmodified materials.

Static and dynamic friction tests ($\mu s, \mu k$) were also conducted on duplicate thrust washers of the above wear life test. The ¾" ID by 1⅛" OD washers were mated to 12 microinch finish 1040 steel wear surfaces. The steel wear surfaces were rotated at 14 ft/min. while loaded to 117 psi contact pressure against the thrust washers. Coefficients of static and dynamic friction were calculated from the measured forces required to initiate and sustain the rotational speed.

| Run No. | # | Additive(s) | Total Wear Depth of Topcoat | Wt. Loss | Coefficients Friction $\mu s$ | $\mu k$ | Remarks |
|---|---|---|---|---|---|---|---|
| 1 | 23 | None | 3.0 in$^{-4}$ | .17% | .20 | .16 | |
| 2 | 3 | Talc | 2.5 | — | .19 | .15 | Non uniform wear scar areas |
| 3 | 2 | Perfluoro Alkoxy Resin | 4.5 | — | .22 | .19 | |
| 4 | 2 | Acetal | 2.8 | — | .20 | .19 | Acetal partially decomposed during curing |
| 5 | 2 | Polyphenylene Sulfide (PPS) Grade P-6 | 2.0 | — | .25 | .20 | Some large particles - erratic coef. of |

-continued

| Run No. | # | Additive(s) | Total Wear Depth of Topcoat | Wt. Loss | Coefficients Friction $\mu s$ | $\mu k$ | Remarks |
|---|---|---|---|---|---|---|---|
| 6 | 4 | Polyphenylene (PPS) Grade P-4 | 2.6 | — | .25 | .16 | friction values Some large particles - erratic coef. of friction values |
| 7 | 3 | Polyphenylene sulfide (PPS) Grade V-1 | 2.3 | — | .21 | .18 | |
| 8 | 3 | Kaolin clay | 2.8 | — | .19 | .15 | |
| 9 | 4 | 5.8 wt. % of PPS, V-1 3:1 with Clay | 1.5 | .10 | .18 | .14 | |
| 10 | 5 | 11.0 wt. % of PPS, V-1 3:1 with Clay | 1.0 | 0.9 | .16 | .16 | |
| 11 | 3 | 15.7 wt. % of PPS, V-1 3:1 with Clay | 2.0 | .07 | .26 | .18 | |

Wear depth losses for the dual additive PPS (V-1) and Clay (Runs 9, 10, and 11) were less than the control prior bearing "DU" (Run 1) and less than either single additive alone (Run 7 and Run 8).

Percent weight losses for the dual additive PPS (V-1) and clay (Runs 9, 10, and 11) were less than the control prior bearing Run 1. These confirming percent weight loss values substantiate the reduced wear depth losses reported above.

The static and kinetic coefficients of friction did not deteriorate with additive incorporation. The dual additive compositions (Runs 9 and 10) were slightly less than the unmodified "Control" (Run 1), while the dual additive composition (Run 11) was slightly greater than the unmodified "Control" (Run 1).

EXAMPLE 4

Wear Life Test—Lubricated Mode

Bushings ¾" ID×0.590" long surrounded a 1040 steel shaft having a 12 microinch finish in a Faville-LeValley Falex Dual Head Journal Bearing Test Machine, Model #5. The bearings and shaft ran submerged in Mobil Brand Oil DTE-26. The shaft rotated at 770 rpm (150 fpm) and was loaded at 100 psi contact pressure. Each test's run duration was 350 hours while the wear depth was periodically recorded.

| Run # | Additive Type | Total Wear Depth of .001 in. Topcoat (in. −4) |
|---|---|---|
| 1 | Prior Art "DU" None | 3.2 |
| 7 | Polyphenylene Sulfide (PPS) Grade V-1 | 3.0 |
| 8 | Clay | 1.3 |
| 9 | PPS (V-1) & Clay | 2 |

Wear depth losses of bearings containing the clay additive (Run 8) and the dual additive PPS (V-1) and clay were again less than those of the unmodified "Control" (Run 1). Wear depth loss of bearings containing the single PPS (V-1) additive (Run 7) were only marginally less than those of the unmodified "Control" (Run 1). Wear life improvement of bearings containing only the PPS (V-1) additive was significantly less in this lubricated test than it was in prior non-lubricated wear life tests of Example 3.

EXAMPLE 5

Bushing Performance Test in Automotive Strut Assemblies 1,000,000 Cycles Each (27 Tests Total)

Bushings 20 mm ID×15 mm long were assembled into the manufacturer's rod guide sleeve housings of automobile strut assemblies. The rod was stroked for 5 in. at a frequency of 106 cycles/minute while pulsating side loads of 60, 100 and 200 pounds were progressively applied to the guide sleeve area of the strut cannister for 15 seconds in one direction, and 20 seconds in the 180° opposing direction. Upon completion of the test, the ID surface of the bushings was examined for separation (stripping) of the topcoated self-lubricating layer from the porous bronze substructure.

| Run # | Additive(s) Type | Topcoat Stripped From Bronze Substructure (# of Stripped Bearing Topcoatings) | Tests (# of Tests) |
|---|---|---|---|
| 1 | None | 3 | 10 |
| 8 | Clay | 6 | 9 |
| 9 | 5.8 wt. % of PPS, V-1 3:1 with Clay | 0 | 8 |

The dual additive bearings containing both PPS (V-1) and clay (Run 9) survived this million cycle test without the topcoated layer stripping from any of the bearings tested.

EXAMPLE 6

Bushing Performance Test at High-Velocity Impact in Automobile Strut Assemblies

Bushings 20 mm ID×15 mm long were assembled into the rod guide sleeves of a strut assembly by an automobile strut manufacturer and evaluated on its high-velocity test equipment. This high-speed test (104 inch/second rebound velocity, 3.9 inch/second compression velocity) is designed to evaluate the extreme limits of strut service as an automobile endures the impact of descending into highway potholes. The strut was side loaded at 100 pounds at the guide sleeve area while the 4-inch stroke proceeded at a frequency of 1 cycle per 1.12 seconds for a total of 10,000 cycles. Upon completion of the test, the ID surface of the bushings was examined for separation (stripping) of the topcoat self-lubricating layer from the porous bronze substructure.

| Run # | Additive(s) Type | Topcoat Stripped From Bronze Substructure (# of Stripped Bearing Topcoatings) | Tests (# of Tests) | Wt. Loss of Bearings Without Stripped Topcoatings (% Loss) |
| --- | --- | --- | --- | --- |
| 1 | None | 4 | 4 | |
| 7 | PPS (V-1) | 0 | 3 | .162 |
| 8 | Kaolin clay | 2 | 3 | .144 |
| 9 | 5.8 wt. % of PPS, V-1 3:1 with Clay | 0 | 5 | .125 |
| 10 | 11.0 wt. % of PPS, V-1 3:1 with Clay | 0 | 1 | .141 |

The dual additive bearings containing PPS (V-1) and clay (Run 9 and 10) as well as the single additive bearing containing PPS (V-1) again completely survived stripping of the self lubricating topcoating in this high velocity rebound strut test. "Control" unmodified bearings (Run 1) and bearings modified with the single additive clay (Run 8) again had stripped topcoating failures.

Although the mechanism of stripping failure, especially during high velocity impact strut rod speeds, is not fully known, it is believed that the oil flow between the shaft and the bearing's self-lubricated topcoat greatly magnifies forces at the surface. These forces are believed to be sufficient to rupture or tear the bond between the topmost surface layer of sintered bronze particles and the topcoated self-lubricating materials. The preferred embodiments of this invention for self-lubricating bearing compositions (Ex. 9-11) have clearly improved resistance to stripping.

Additional synergistic benefit also is believed to accrue in the preferred embodiments because of clay's ability to contain oil. The topcoat layer undergoes wear during service. This wear constantly exposes new clay particles at the surface to insure intimate oil contact at this location, thereby protecting the vulnerable surface area from direct high-velocity flow with an adhering protective oil film.

What is claimed is:

1. A self lubricating, composite bearing having improved resistance to stripping and improved wear resistance comprising:
   a metal backing;
   a porous layer on the backing;
   a sintered lining on and impregnated into the porous layer, said lining formed from a blend comprising by weight:
      a major proportion of lead or a lubricating alloy of lead;
      a minor proportion of perfluorinated polymer selected from the group consisting of homopolymers and copolymers of polytetrafluoroethylene;
      from about 3 to about 15% of a particulate thermoplastic polymer having a mean particle size less than about 20 microns; and
      from about 1 to about 5% of clay;
   said thermoplastic polymer being selected to improve the adherence of the sintered lining to the porous layer, the thermoplastic polymer being substantially undegraded when sintered in the blend to form the lining.

2. The bearing of claim 1 wherein the thermoplastic polymer comprises polyarylene sulfide.

3. The bearing of claim 1 wherein the particulate thermoplastic polymer comprises polyphenylene sulfide.

4. The bearing of claim 1 wherein the clay has a Mohs hardness of less than about 3.

5. The bearing of claim 1 wherein the clay comprises kaolin.

6. The bearing of claim 1 wherein the lead or lead alloy is present in a weight ratio to perfluorinated polymer between about 1.0 and 1.5.

7. The bearing of claim 1 wherein the clay has an average particle size less than about 20 microns.

8. The bearing of claim 1 wherein the lining has been sintered at a temperature and for a time sufficient to effect the sintering but which is insufficient to cause substantial degradation of the thermoplastic polymer in the lining.

9. The bearing of claim 8 wherein the sintering temperature is at least about 675° F. for 3 minutes.

10. A shock absorber or MacPherson strut including the bearing of claim 1.

11. A method of preparing a self-lubricating composite bearing comprising:
   providing a laminated underlayment having a porous layer;
   applying to the porour layer a lining formed from a blend comprising by weight:
      a major proportion of lead or a lubricating alloy of lead;
      a minor proportion of perfluorinated polymer selected from the group consisting of homopolymers and copolymers of polytetrafluoroethylene;
      from about 3 to about 15% of a particulate thermoplastic polymer having a mean particle size less than about 20 microns; and
      from about 1 to about 5% of clay;
   causing the blend to impregnate the porous layer;
   heating said lining for a time and at a temperature sufficient to sinter the lining but insufficient to cause substantial degradation of the thermoplastic polymer in the lining.

12. The method of claim 11 wherein the particulate thermoplastic polymer comprises polyarylene sulfide.

13. The method of claim 11 wherein the particulate thermoplastic polymer comprises polyphenylene sulfide.

14. The method of claim 11 wherein the clay has a Mohs hardness of less than about 3.

15. The method of claim 11 wherein the clay comprises kaolin.

16. The method of claim 11 wherein the lead or lead alloy is present in a weight ratio to perfluorinated polymer between about 1.0 and 1.5.

17. The method of claim 11 wherein the clay has an average particle size less than about 20 microns.

18. The method of claim 11 wherein the sintering temperature is at least about 675° F. for three minutes.

19. A bearing produced in accordance with the method of claim 11.

* * * * *

UNITED STATES PATENT AND TRADEMARK OFFICE
CERTIFICATE OF CORRECTION

PATENT NO. : 4,575,429

DATED : March 11, 1986

INVENTOR(S) : Charles B. Jacobson

It is certified that error appears in the above-identified patent and that said Letters Patent is hereby corrected as shown below:

Col. 2, l. 62-63, insert --by-- between "15%" and "weight".

Col. 2, l. 64, delete "15%" and substitute --5%-- therefor.

Col. 3, l. 48, delete "DV" and substitute --DU-- therefor.

Col. 3, line 53, delete "2,689,390" and substitute "2,689,380" therefor.

Col. 8, l. 55-56, insert --of-- between "Coefficients" and "Friction".

Col. 9, Run No. 10, Weight Loss should be 0.09.

Col. 11, l. 5, delete "topcoat" and substitute --topcoated-- therefor.

Col. 12, l. 33, delete "porour" and substitute --porous-- therefor.

Signed and Sealed this

Twelfth Day of August 1986

[SEAL]

Attest:

DONALD J. QUIGG

Attesting Officer

Commissioner of Patents and Trademarks